(12) United States Patent
Thrun

(10) Patent No.: US 6,349,675 B1
(45) Date of Patent: Feb. 26, 2002

(54) COVER FOR ANIMAL ENCLOSURES SUCH AS AQUARIUMS

(76) Inventor: David James Thrun, 2444 Chalet Gardens Ct., Apt . #5, Madison, WI (US) 53711

(*) Notice: Subject to any disclaimer, the term of this patent is extended or adjusted under 35 U.S.C. 154(b) by 0 days.

(21) Appl. No.: 09/437,666

(22) Filed: Nov. 10, 1999

Related U.S. Application Data

(60) Provisional application No. 60/108,630, filed on Nov. 16, 1998.

(51) Int. Cl.[7] ............................................. A01K 63/00
(52) U.S. Cl. ...................................................... 119/265
(58) Field of Search .............................. 119/15, 5, 269; 362/101; 220/345

(56) References Cited

U.S. PATENT DOCUMENTS

| | | |
|---|---|---|
| 3,018,758 A | 1/1962 | Arnould |
| 3,225,736 A | 12/1965 | Willinger et al. |
| 3,234,905 A | 2/1966 | Olson |
| 3,721,212 A | 3/1973 | Groth |
| 3,834,351 A | 9/1974 | Schmidt |
| 3,857,366 A * | 12/1974 | Willinger ........................ 119/5 |
| 4,206,719 A | 6/1980 | Faris |
| 4,576,115 A * | 3/1986 | Gordon .......................... 119/5 |
| 4,920,922 A * | 5/1990 | Tominaga ....................... 119/5 |
| 5,000,117 A | 3/1991 | Gordon |
| 5,005,522 A | 4/1991 | Gordon |
| 5,009,190 A | 4/1991 | Gordon |
| 5,089,940 A | 2/1992 | Lanzarone et al. |
| 5,138,976 A | 8/1992 | Gordon |
| 5,255,811 A | 10/1993 | Simon |
| 5,328,049 A | 7/1994 | Ritzow |
| 5,363,801 A * | 11/1994 | Watters et al. ................ 119/15 |
| 5,370,081 A | 12/1994 | Gordon |
| 5,445,112 A | 8/1995 | Grosman |
| 5,479,884 A | 1/1996 | Grosman |
| 5,488,931 A | 2/1996 | Grosman |
| 5,762,026 A | 6/1998 | Watters |
| 5,832,871 A | 11/1998 | Leis |

* cited by examiner

Primary Examiner—Charles T. Jordan
Assistant Examiner—Jordan Lofdahl
(74) Attorney, Agent, or Firm—Craig A. Fieschko, Esq.; Dewitt Ross & Stevens S.C.

(57) ABSTRACT

An animal enclosure cover may be provided on an animal enclosure (such as an aquarium) to prevent the escape of animals therein. The animal enclosure cover includes a stationary panel and one or more clamping members, wherein the clamping members are used to affix the stationary panel atop the animal enclosure. The stationary panel is bounded by a peripheral frame having opposing upper and lower surfaces. Each clamping member similarly has opposing upper and lower surfaces, and the clamping member upper surfaces are shaped to extend in parallel relation to at least a portion of the peripheral frame of the stationary panel. The stationary panel may therefore be fit on the top rim surface of the enclosure rim of the animal enclosure, and each of the clamping members may be fit below the enclosure rim with the upper surfaces of the clamping members being aligned in parallel spaced relationship to the lower surface of the stationary panel. The stationary panel and clamping members may then be brought together to clamp the enclosure rim therebetween, and an attachment member (such as a fastener, hook, clip, etc.) may be extended between the stationary panel and clamping members to affix them together on the enclosure rim. Where the stationary panel does not occupy the entirety of the enclosure rim, a door may be pivotally affixed to the peripheral frame of the stationary panel so that the door abuts a portion of the enclosure rim. The door may be opened to allow access to the interior of the animal enclosure, and it may bear a latch which can be actuated to engage the enclosure rim when the door is closed.

20 Claims, 4 Drawing Sheets

COVER FOR ANIMAL ENCLOSURES SUCH AS AQUARIUMS

CROSS-REFERENCE TO RELATED APPLICATIONS

This application claims priority under 35 USC §119(e) to U.S. Provisional Patent Application 60/108,630 filed Nov. 16, 1998, the entirety of which is incorporated by reference herein.

FIELD OF THE INVENTION

This disclosure concerns an invention relating generally to animal cages, and more specifically to covers and lids for animal enclosures such as aquariums/vivariums.

BACKGROUND OF THE INVENTION

Small mammals (such as ferrets, hamsters, gerbils, etc.), reptiles (such as snakes, chameleons, etc.), and insects/arachnids (such as tarantulas, scorpions, beetles, etc.) are becoming increasingly popular as pets, and are commonly housed by pet owners in standard animal enclosures such as aquariums. Aquariums available on the market today almost universally have transparent receptacles, e.g., box-shaped receptacles having glass sidewalls, which are capped with plastic or metal rims at their mouths. This rim generally protrudes inwardly and/or outwardly from the receptacle sidewalls, and/or has a lip extending inwardly from its inner perimeter. The rim (or its lip, if present) is often used to support a cover which prevents objects from falling into the water within the enclosure when it is used to hold aquatic animals, or to prevent the escape of animals when it is used to house land-based or amphibious animals.

A common problem with the use of such enclosures and covers to house land animals is that such animals are prone to escape. The covers, unless weighted down, are generally easily pushed aside by even very small animals. The use of weighting is disliked because it makes it difficult for animal owners to easily access the interiors of the enclosures, and it additionally poses a problem in that animals can sometimes push the covers slightly askance from the rims/lips, which then causes the weighted covers to fall within the enclosures. Further, even when the covers are weighted, they are often made of thin plastic or other lightweight materials which are so flimsy that the covers are easily bent, thereby allowing an animal to bend a portion of the cover upwardly (either temporarily or permanently) to allow just so much space that the animal may escape.

SUMMARY OF THE INVENTION

The invention is directed to an animal enclosure cover which may be provided on an animal enclosure (such as an aquarium), and which is extremely effective in preventing the escape of land animals. The invention, which is defined by the claims set out at the end of this disclosure, may be understood from the following summary and by reference to the accompanying drawings. As exemplified in FIGS. 1–2, an animal enclosure cover includes a stationary panel and one or more clamping members, wherein the clamping members are used to affix the stationary panel atop the animal enclosure. The stationary panel is bounded by a peripheral frame having opposing upper and lower surfaces. Each clamping member similarly has opposing upper and lower surfaces, and the clamping member upper surfaces are shaped to extend in parallel relation to at least a portion of the peripheral frame of the stationary panel. The stationary panel may therefore be fit on the top rim surface of the enclosure rim of the animal enclosure, and each of the clamping members may be fit below the enclosure rim with the upper surfaces of the clamping members being aligned in parallel spaced relationship to the lower surface of the stationary panel. The stationary panel and clamping members may then be brought together to clamp the enclosure rim therebetween, and an attachment member (such as a fastener, hook, clip, etc.) may be extended between the stationary panel and clamping members to affix them together on the enclosure rim. Where the stationary panel does not occupy the entirety of the enclosure rim, a door may be pivotally affixed to the peripheral frame of the stationary panel so that the door abuts a portion of the enclosure rim. The door may be opened to allow access to the interior of the animal enclosure, and it may bear a latch which can be actuated to engage the enclosure rim when the door is closed.

Preferably, the frame of the stationary panel is shaped to follow the perimeter of a rectangle or other polygon, or at least it partially encloses a central area, whereby at least a portion of the central area can be said to rest between two opposing frame members. Most preferably, this central area is occupied by material which is at least partially transparent, e.g., mesh or glass, so as to effectively provide a window borne with the stationary panel's frame. Similarly, several clamping members can be provided wherein the clamping members are connected to define a clamping panel which extends in parallel spaced relation to at least a portion of the stationary panel when the enclosure rim is clamped between the stationary and clamping panels.

Animal enclosures such as these have been tested and have been found to work extremely well. In particular, it has been found to be effective in thwarting the escape of snakes and other strong animals which are prone to escaping, for which no other effective animal enclosure covers are known on the market.

Further advantages, features, and objects of the invention will be apparent from the following detailed description of the invention in conjunction with the associated drawings.

DETAILED DESCRIPTION OF PREFERRED EMBODIMENTS OF THE INVENTION

Figure 1:
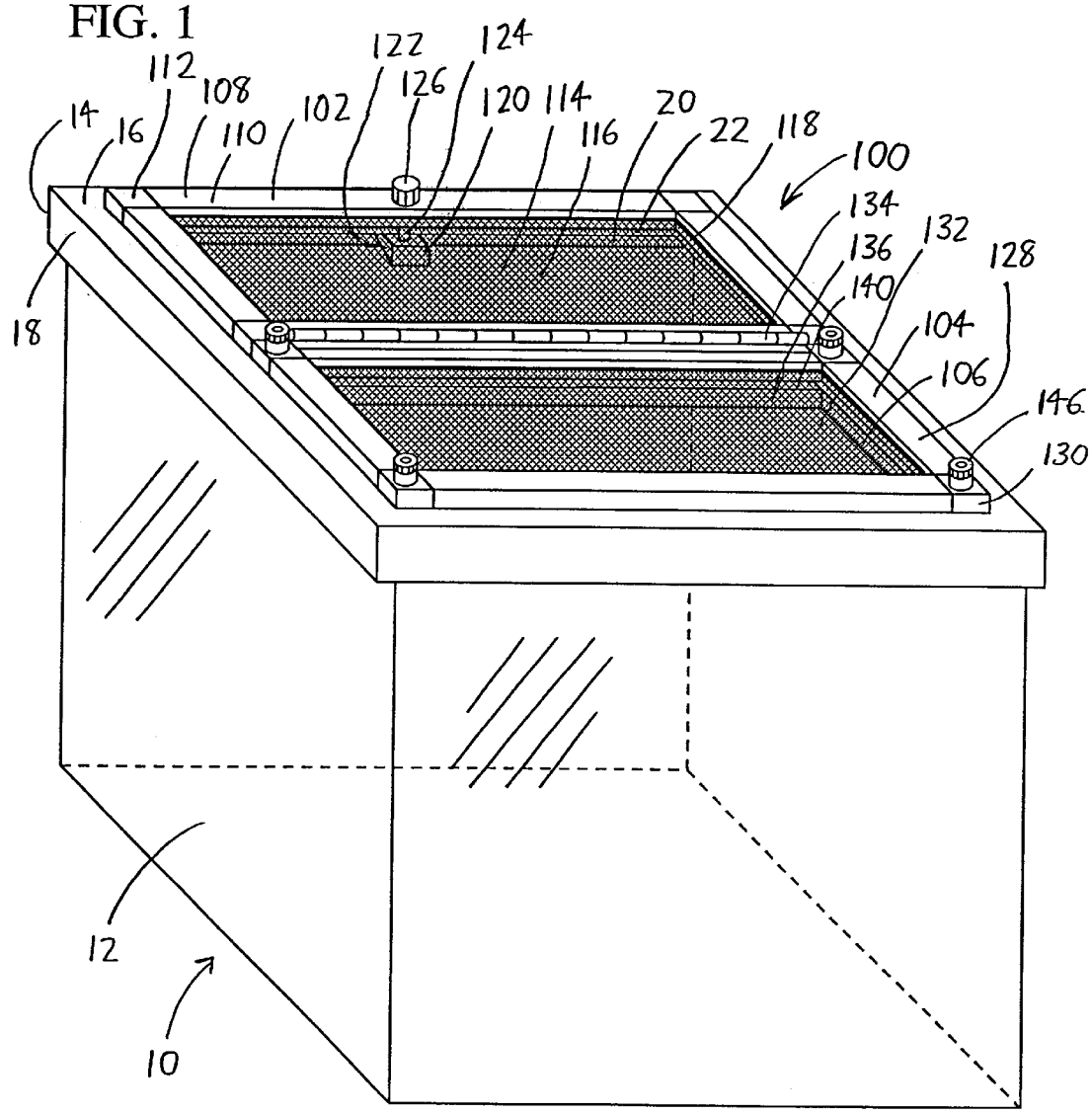
FIG. 1 is a top perspective view of a first exemplary embodiment of an animal enclosure and an accompanying animal enclosure cover, with the rear of the cover shown in the foreground.

Following is a more detailed description of exemplary preferred embodiments of the invention. It should be understood that in the accompanying drawings, which will frequently be referred to in the following description, the same or similar features of the invention are designated throughout the Figures with the same reference numerals. In addition, throughout the following description (as well as in this document in general), terms of orientation—e.g., "rear," "front," "top," "bottom," etc.—are relative terms used for the sake of convenience, and should not be construed as limiting the invention to these orientations. For example, in the summary of FIG. 1 given above, it is stated that the rear of the cover is shown in the foreground; however, the invention would function equally well if rotated so that the designated "rear" was instead effectively transformed into the front of the cover.

Figure 2:
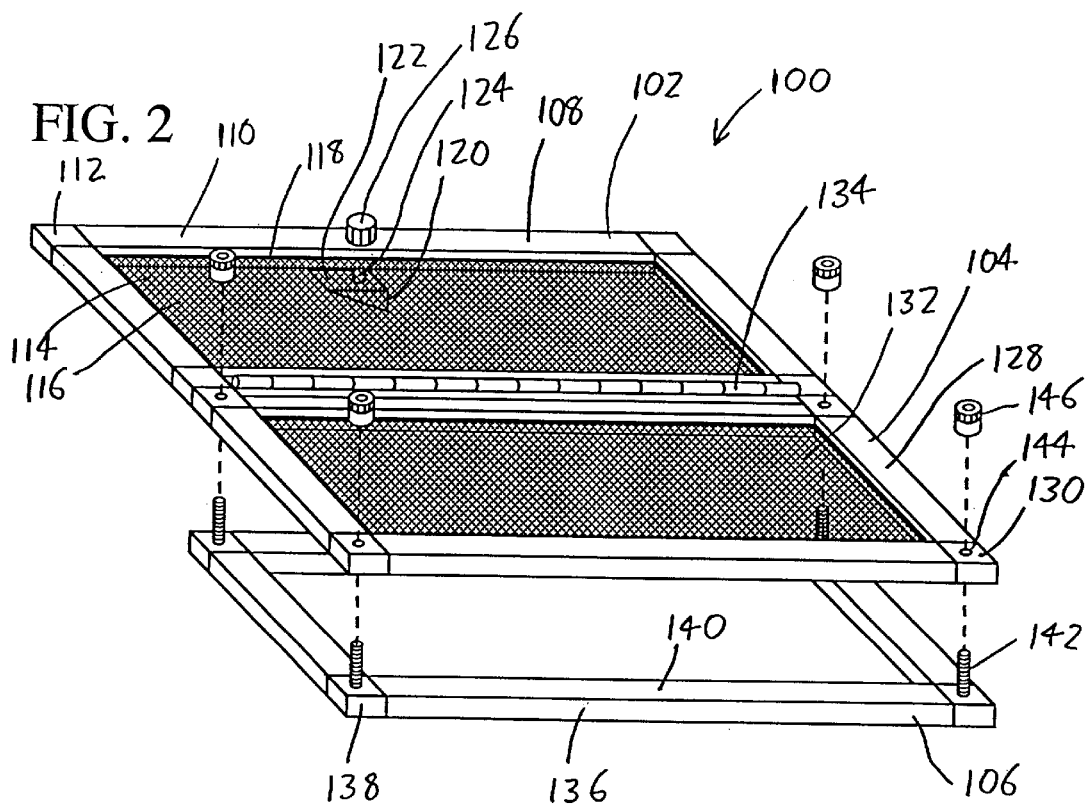
FIG. 2 is a top exploded perspective view of the animal enclosure cover of FIG. 1, shown with the animal enclosure being absent.
Figure 3:
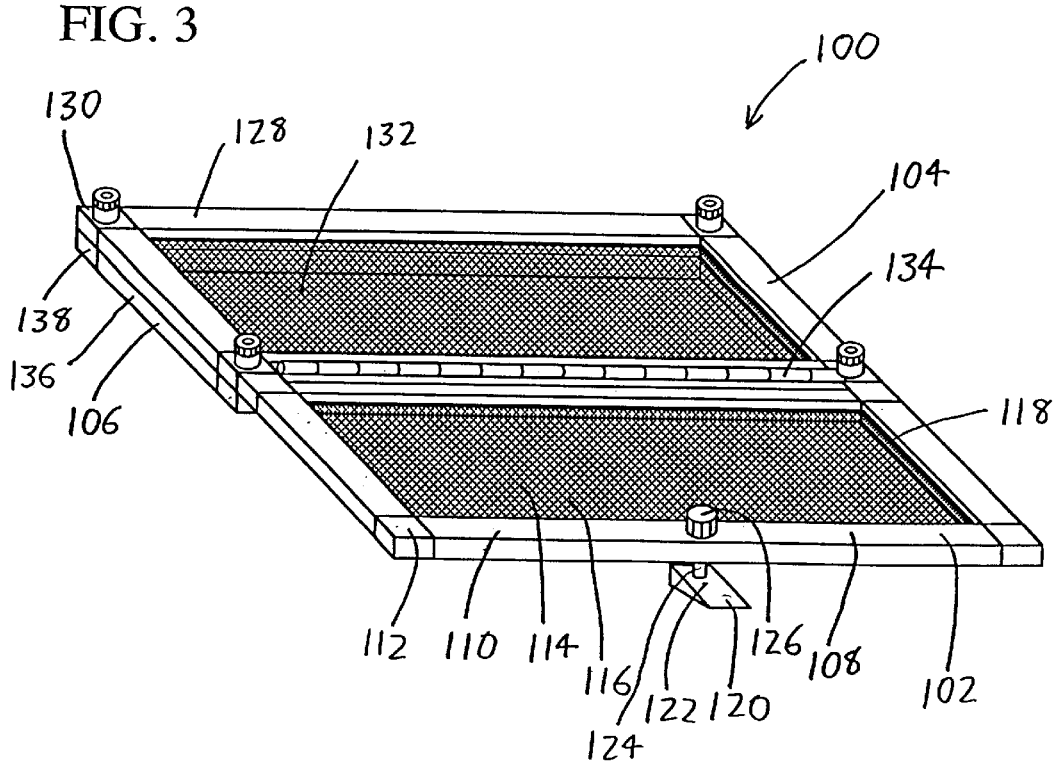
FIG. 3 is a top perspective view of the animal enclosure cover of FIGS. 1 and 2, shown with the front of the cover in the foreground.

FIGS. 1–3 depict a first preferred embodiment of the invention, wherein FIG. 1 depicts an animal enclosure 10 equipped with an enclosure cover 100. The enclosure 10 is a standard aquarium-type enclosure, with a transparent bottom and sidewalls 12 forming a receptacle which opens at an enclosure rim 14. Usually, in standard aquarium-type enclosures 10, the sidewalls 12 are made of glass whereas the rim 14 is made of plastic molding which is fit over the top edges of the sidewalls 12. The rim 14 has an upper surface 16 and an opposing lower surface (not shown), as well as an outer surface 18 and an opposing inner surface (partially shown at 20 in FIG. 1) which both extend between the upper surface 16 and lower surface. The inner surface 20 may include an inwardly-protruding flange-like lip or similar structure, as partially shown at 22 in FIG. 1, to allow a cover (such as cover 100) to be supported thereon. Throughout this disclosure, the term "enclosure rim" will be used to generally refer to both the enclosure rim 14 in general, and also more specifically the lip 22.

The cover 100 has three main components, a door 102, a stationary panel 104 pivotally affixed to the door 102, and a clamping panel 106. Prior to discussing each of these components in detail, it will first be helpful to review the general function and operation of the cover 100. As can be best understood with reference to FIGS. 1 and 2, the cover 100 is affixed atop the enclosure 10 by placing the clamping panel 106 within the enclosure 10 and beneath the lower surface of the enclosure rim 14 (e.g., below the lip 22) and then placing the stationary panel 104 atop the upper rim surface 16 of the enclosure rim 14 (e.g., atop the lip 22). The stationary panel 104 is then removably attached to the clamping panel 106 so that the enclosure rim 14 is clamped between the panels 104 and 106, thereby firmly affixing the stationary panel 104 and clamping panel 106 to the enclosure rim 14. Note that in FIG. 5 and later Figures, where the enclosure 10 is not shown and the stationary panel 104 and clamping panel 106 are shown affixed together, they are shown without a space between them for accommodating the enclosure rim 14.

The door 102—which is generally open during the foregoing attachment process by pivotally swinging it out of the plane of the stationary panel 104 to allow easier access to the interior of the enclosure 10—may then be swung into the plane of the stationary panel 104 so that it also fits atop the enclosure rim 14. The stationary panel 104 and door 102 are preferably sized so that when the door 102 is closed in this manner, the stationary panel 104 and door 102 closely fit atop the enclosure rim 14 to extend across the entire mouth of the enclosure 10.

Each of the door 102, the stationary panel 104, and the clamping panel 106 will now be discussed in greater detail in turn.

The door 102 preferably includes a rectangular peripheral door frame 108 formed of a number of elongated door frame members 110 extending between door corners 112. The door frame 108 encircles a viewing portion 114 defined within the door 102, and a substantially transparent material extends across the viewing portion 114 so that the viewing portion 114 does not provide an open aperture through which animals may escape. In the enclosure cover 100 of FIGS. 1–3, the viewing portion 114 of the door 102 is occupied by a mesh screen 116, but other transparent materials—e.g., a glass or transparent plastic sheet, either solid or foraminated—may be used instead.

Most preferably, the door frame members 110 and door corners 112 are formed of channels and corner connectors of the type commonly used to construct custom-sized window screens for residential housing. These channels and corner connectors are particularly suitable for use in constructing the door 102 because they are usually formed of relatively strong and inflexible metal, and they provide a resistance to bending which helps to prevent the escape of animals. To form such a door frame 108, the channels of the door frame members 110 are cut to the desired length and are then connected by means of the corner connectors of the door corners 112. The channels/door frame members 110 each bear grooves 118 extending along one of their sides, and when forming the door frame 108, these grooves 118 are situated adjacent the viewing portion 114 defined within the door 102. The screen 116 is then installed by inserting its edges within these grooves 118, and then pushing in resilient sealing strips (not shown), e.g., rubber strips, which expand to fix the edges of the screen 116 in the grooves.

The door 102 preferably includes a latch 120 which can be used to firmly affix the door 102 to the enclosure rim 14 of the animal enclosure 10. In the exemplary cover 100 shown in FIGS. 1–3 (as well as in certain alternative covers to be discussed later), the latch 120 is provided by a wedge 122 affixed to a pin 124 which rotatably extends through the door 102 and which terminates in a knob 126 for easier actuation. Thus, once the door 102 is placed atop the enclosure rim 14 of the enclosure 10, the knob 126 may be rotated to swing the wedge 122 under the enclosure rim 14 of the enclosure 10 (into the position shown in FIGS. 1 and 3), thereby preventing opening of the door 102. Because the sloped face of the wedge 122 bears against the enclosure rim 14 with increasing force as it is rotated, it will firmly clamp the door 102 to the enclosure rim 14 when it is sufficiently rotated. While not illustrated in the Figures, it is particularly preferred to have a spring situated between the latch knob 124 and the upper surface 16 of the enclosure rim 14 so that the wedge 120 is driven upwardly. A user may therefore actuate the wedge 120 to clear the enclosure rim 14 by simply pushing down on the latch knob 124 and rotating it at the same time; at the same time, the spring-loading of the wedge 120 against the enclosure rim 14 makes it extremely difficult for animals to dislodge.

The stationary panel 104 is preferably constructed similarly to the door 102, and therefore has a number of stationary panel members 128 joined at stationary panel corners 130 to surround a screened viewing portion 132. The stationary panel 104 is preferably pivotally affixed to the door 102 by means of a hinge such as the piano hinge 134 illustrated in the drawings.

The clamping panel 106 is preferably formed of a number of elongated clamping members 136 joined at clamping panel corners 138 in a manner similar to the assemblies of the stationary panel 104 and door 102, but it need not (and preferably does not) include a screen. The clamping panel 106 is configured so that its clamping members 136 extend in generally parallel relation to the stationary panel members 128 (and more generally, so that the upper surface 140 of the clamping panel 106 extends in generally parallel relation to the lower surface of the stationary panel 104). As a result, attachment members such as fasteners, clips, buckles, hooks, or other structures may extend between the clamping panel 106 and stationary panel 104 to affix them together at various points about their circumferences with the enclosure rim 14 sandwiched therebetween. In the cover 100 shown in the drawings (see particularly FIG. 2), this is done by providing threaded fasteners 142 which extend upwardly from the corners of the clamping panel 106 and through apertures 144 in the stationary panel 104. The fasteners 142 are then engaged by nuts 146, which are preferably knurled so that they may be actuated by hand without the use of tools. This arrangement is particularly preferred because it allows very easy and rapid attachment of the stationary panel 104 and clamping panel 106 about the enclosure rim 14 of the enclosure 10: the clamping panel 106 is simply inserted within the interior of the enclosure 10 beneath the enclosure rim 14, the stationary panel 104 is aligned with the clamping panel 106 so that the fasteners 142 extend through all of the apertures 144 simultaneously, and then the nuts 146 are screwed on from the outside of the enclosure 10.

Keeping in mind that the cover 100 of FIGS. 1–3 is merely exemplary of structures encompassed by the invention, several particularly preferred possibilities for modifying the enclosure cover 100 will now be discussed.

Initially, it is noted that while the door frame 108 is preferably formed in the foregoing manner and it preferably includes the screened viewing portion 114, the frame 108 need not be formed in this fashion and it need not even include a viewing portion 114. As an example, rather than using the assembled door frame members 110 and door corners 112, the frame 108 could simply be formed of an integrally formed rectangular member having a viewing portion 114 across which a screen 116 is attached by fastening or adhering it to the member. Alternatively, the frame 108 could be formed of two such rectangular members between which a screen 116 is sandwiched. Further, the door 102 could simply consist of a slab which lacks any viewing portion 114 whatsoever, e.g., a solid piece of material such as glass or translucent plastic (though opaque materials could be used as well). Similar modifications could be applied to the stationary panel 104, and even to the clamping panel 106.

Further, where a screened viewing portion 114 is used on the door 102, the door frame 108 may accommodate either metal screen, which may be used when larger and stronger animals are kept within the enclosure 10, or plastic screen (e.g., nylon screen) to prevent irritation to animals that might have a tendency to rub against the screen. It is further possible to install layered sheets of nylon and metal screen so that the nylon screen rests within the interior of the enclosure 10 to prevent injury to the animal, and the metal screen rests above the nylon screen (and outside the enclosure 10) for reinforcement purposes. Again, these modifications can also be applied to the stationary panel 104, and even to the clamping panel 106 if the clamping panel 106 is provided with screen.

As previously noted, other pivoting arrangements between the stationary panel 104 and the door 102 may be used instead of (or in addition to) the piano hinge 134. As examples, separate spaced hinges, pin-and-clevis arrangements between the door 102 and stationary panel 104, strips of flexible material attached to the door 102 and stationary panel 104, or other arrangements could be used.

Figure 4:
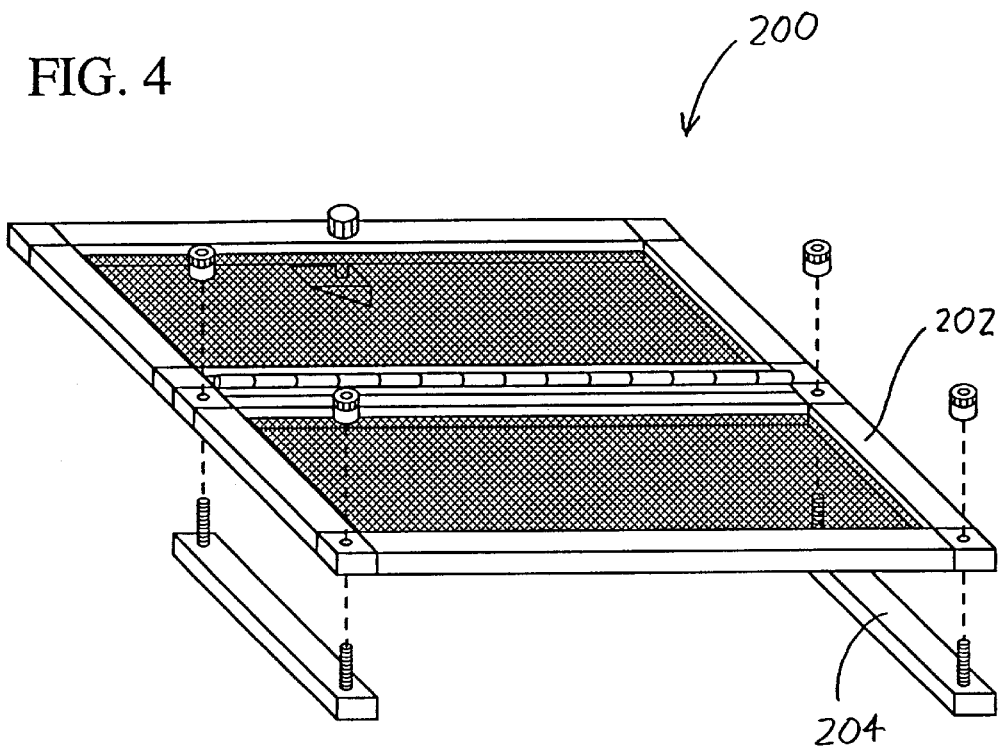
FIG. 4 is a top exploded perspective view of a second exemplary embodiment of an animal enclosure cover, shown with the rear of the cover in the foreground.

As another exemplary modification, the clamping panel 106 need not take the form of a frame having a configuration which is generally similar to the door 102 and/or stationary panel 104, and it could instead be formed of one or more beams or other clamping members which fit beneath the enclosure rim 14 and allow attachment to the stationary panel 104 above the enclosure rim 14. An example of such an arrangement is illustrated in FIG. 4, wherein a cover 200 includes a stationary panel 202 to which elongated clamping members 204 are attached at two of its opposing sides. These clamping members 204 operate similarly to the clamping panel 106 in that they are affixed in parallel spaced relation to the stationary panel 202, with the enclosure rim 14 resting between the stationary panel 202 and the clamping members 204. Preferably, such clamping members 204 each extend over at least a major portion of any side of an enclosure rim 14 on which the cover 200 is mounted, and most preferably extend over the entirety of any side of the enclosure rim 14 (i.e., between opposing sides of the enclosure rim 14). It has been found that this greatly enhances the overall rigidity of the cover 200 and thereby deters animal escape. Similarly, rigidity can be enhanced if clamping members 204 are joined to extend around corners and across two or more sides of the enclosure rim 14, e.g., in L-shapes or U-shapes, with a complete loop naturally providing greatest rigidity. For the sake of rigidity, the single-piece clamping panel 106 is preferred over the use of multiple clamping members 204.

Figure 5:
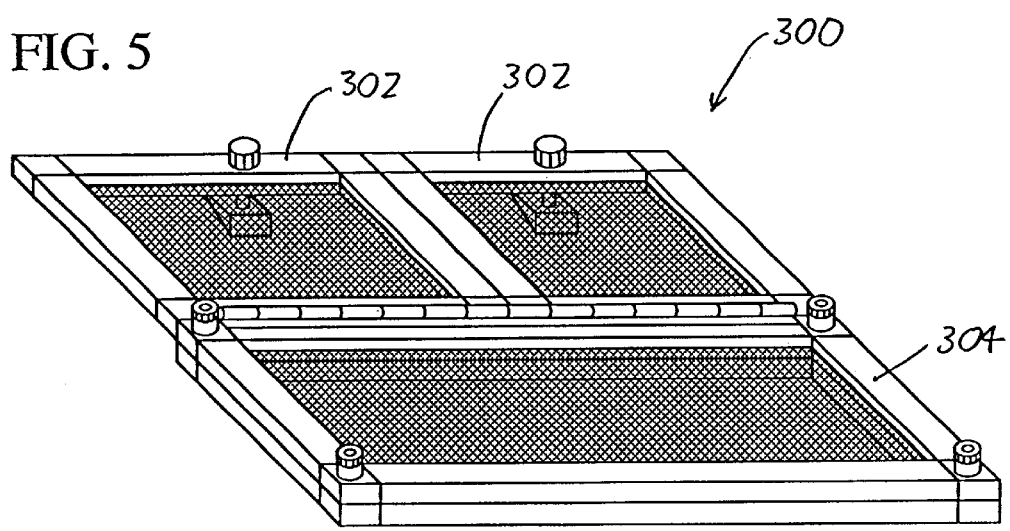
FIG. 5 is a top perspective view of a third exemplary embodiment of an animal enclosure cover.
Figure 6:
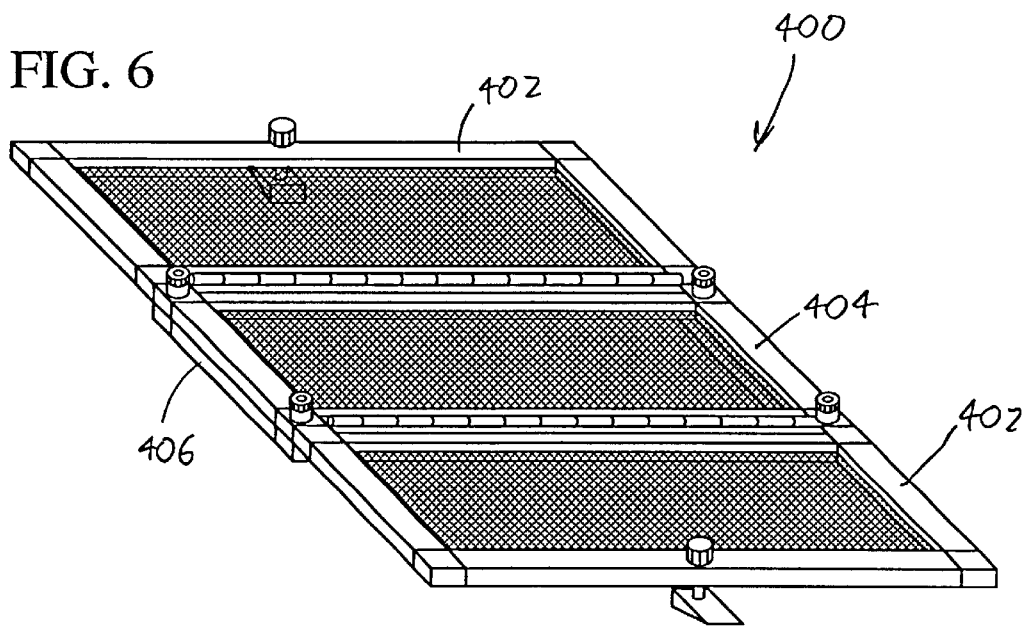
FIG. 6 is a top exploded perspective view of a fourth exemplary embodiment of an animal enclosure cover, shown with the rear of the cover in the foreground.

As exemplified by the cover 300 of FIG. 5, multiple doors 302 may be included adjacent the stationary panel 304. In the case of the cover 300, the doors 302 each occupy a quadrant of the cover 300 and are independently openable. It is also possible to form covers wherein the door(s) do not occupy an entire side of the cover; for example, in the cover 300, one of the doors 302 could be rigidly affixed to the stationary panel 304 such that only one door 302 is provided, and such that it only occupies one quadrant of the cover 300. Similarly, doors can be included on more than one side of the stationary panel. FIG. 6 illustrates another cover 400 with multiple doors 402 affixed to opposing sides of a stationary panel 404. This stationary panel is illustrated as using clamping members 406 similar to the clamping members 204 of FIG. 4.

Figure 7:
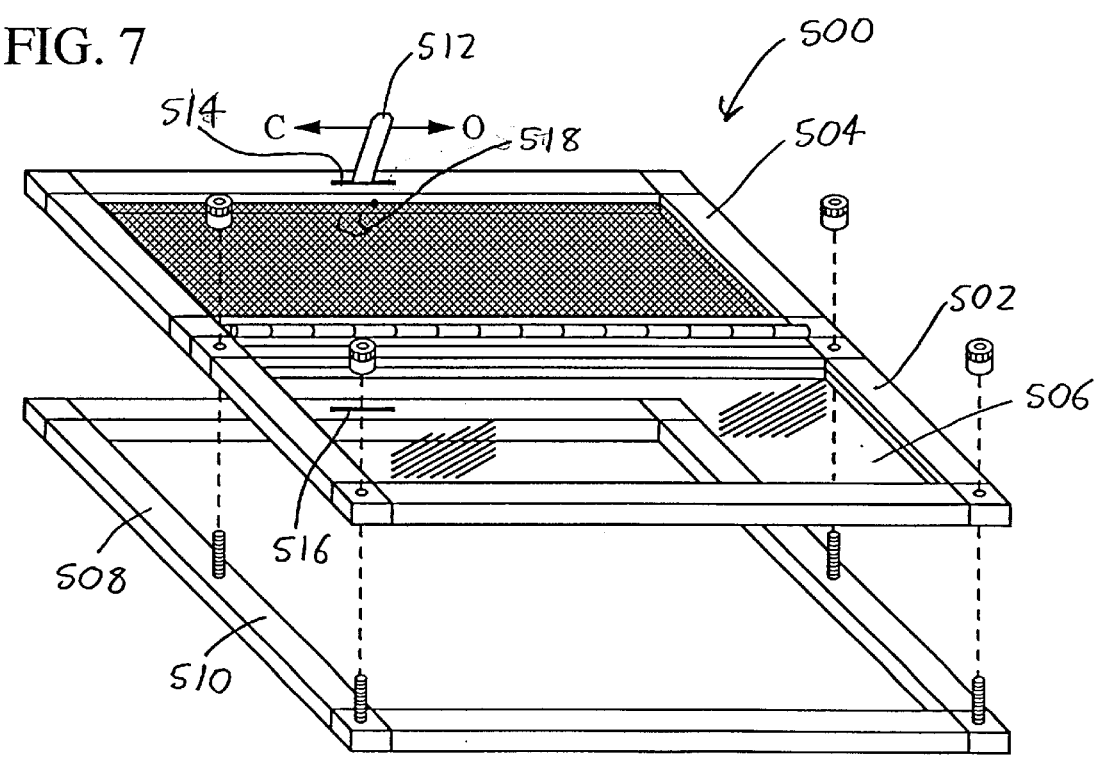
FIG. 7 is a top exploded perspective view of a fifth exemplary embodiment of an animal enclosure cover, shown with the rear of the cover in the foreground.

FIG. 7 then illustrates a cover 500 demonstrating a number of exemplary modifications to the structure of the cover 100. The cover 500 includes a stationary member 502 pivotally affixed to a door 504, but the stationary member 502 is provided with a glass-covered or transparent plastic-covered viewing portion 506 rather than a screened viewing portion. Additionally, a clamping panel 508 is provided with clamping members 510 which extend in parallel spaced relation to the outer portion of both the stationary member 502 and the door 504 combined. As a result, when the stationary panel 502 and the clamping panel 508 are affixed together, the outer edges of the clamping panel 508 are aligned with the outer edges of both the stationary panel 502 and the closed door 504. This embodiment is particularly advantageous in that it allows the use of a latching mechanism wherein the door 504 affixes to the clamping panel 508, rather than to the enclosure rim 14 or other structure on the animal enclosure 10. As an example, on the cover 500, a substantially flat, lever-like latch 512 is pivotally affixed within a slot 514 extending from the top of the door 504 to its bottom. A similar slot 516 is provided in the clamping panel 508, though where the clamping panel 508 is hollow, the slot 516 need not extend from the top of the clamping panel 508 to its bottom, and it can instead only be provided in the top of the clamping panel 508 so that it extends into the hollow space therein. A protruding tooth 518 is provided at one end of the latch 512. The latch 512 may be switched to an open position (designated by direction O) wherein the end of the latch 512 bearing the tooth 518 will readily slip into and out of the slot 516 when the door 504 is opened and closed. Alternatively, the latch 512 may be switched to a closed position (designated by direction C) wherein the tooth 518 will engage the bottom or interior of the clamping panel 508 when the door 504 is closed. The latch 512 must naturally be spaced inwardly from the outer perimeter of the door 504 and clamping panel 508 that it will not experience interference from the enclosure rim 14 when the cover 500 is clamped thereon.

Advantageously, since the latch 512 engages only the cover 500 and does not need to engage the enclosure rim 14 (or another portion of the enclosure 10), it is difficult for animals to tamper with and defeat. Of course, other latches and locking arrangements may be used instead of the one shown, with latches such as those used in kitchen cabinets, medicine cabinets, and the like providing good examples for potential use.

It is understood that the various alternative embodiments of the invention are shown and described above in order to illustrate different possible features of the invention, and the varying ways in which these features may be combined. Apart from combining the different features of the above embodiments in varying ways, other modifications are also considered to be within the scope of the invention. Following is an exemplary list of such modifications.

First, it should be understood that in the invention, the animal enclosure 10 need not take the form of an aquarium-type enclosure, wherein the enclosure's walls are formed substantially or entirely of transparent material (e.g., glass or transparent plastic). Other animal enclosures suitable for use in the invention may include one or more walls made of wire mesh, bars, or other foraminated surfaces, or may have insets of foraminated material in otherwise solid walls (e.g., mesh areas inset within glass walls). The enclosure cover may be used with these types of enclosures equally as well as aquarium-type enclosures.

Second, it should be understood that the cover doors, stationary panels, clamping panels, etc., need not have the rectangular form and proportionate dimensions shown. The cover may be formed to fit enclosure rims of any size and shape (e.g., hexagonal and octagonal enclosure rims).

Third, it is emphasized that the structure of the cover 100 is susceptible to a variety of further modifications which are not noted above. As an example, with reference to the cover 100 of FIGS. 1–3, the door frame 108 could have one or more open sides—e.g., one of the door frame members 110 could be omitted so that the door frame 108 only surrounds three sides of its viewing portion 114—so that a screen or plate can slide into and out of the door 102 (perhaps at its grooves 118) to occupy (or be removed from) the viewing portion 114. This sliding member could effectively provide the opening function for the door 102, in which case the hinge 134 can be omitted. In this event, the latch 120 might also be omitted, though it might be desirable to incorporate a latch that would prevent animals within the enclosure from sliding the door 102 open. Similarly to the door 102, the stationary panel 104 need not have its stationary panel members 128 completely surround the area of its viewing portion 132.

The invention is not intended to be limited to the preferred embodiments described above, but rather is intended to be limited only by the claims set out below. Thus, the invention encompasses all alternate embodiments that fall literally or equivalently within the scope of these claims.

What is claimed is:

1. An animal enclosure cover comprising:
   a. a stationary panel bounded by a peripheral frame having a lower surface;
   b. at least one elongated clamping member having an upper surface shaped to extend in parallel relation to at least a portion of the peripheral frame;
   c. an attachment member extending vertically between the stationary panel and clamping member, wherein the stationary panel and clamping member are adjustably affixed to the attachment member so as to allow variation in the distance between the peripheral frame lower surface and the clamping member upper surface;

whereby the animal enclosure cover may be fit on an enclosure rim having opposing top and bottom rim surfaces, with the lower surface of the stationary panel resting in parallel spaced relationship to the upper surface of the clamping member, and having the enclosure rim clamped therebetween.

2. The animal enclosure cover of claim 1 further comprising a door pivotally affixed to the peripheral frame.

3. The animal enclosure cover of claim 1 wherein the peripheral frame includes elongated frame members extending between frame corners, the frame members at least partially encircling a central area.

4. The animal enclosure cover of claim 1 wherein the stationary panel includes a viewing portion at least partially encircled by the peripheral frame, the viewing portion being at least partially transparent.

5. The animal enclosure cover of claim 1 including several clamping members attached together to define a clamping panel, the clamping panel extending in parallel relation to at least a portion of the stationary panel when the enclosure rim is clamped therebetween.

6. The animal enclosure cover of claim 1 wherein the attachment member is a threaded fastener.

7. The animal enclosure cover of claim 1:
   in combination with an animal enclosure including a receptacle which opens at an enclosure rim, wherein the enclosure rim has an upper surface and an opposing lower surface, and wherein the receptacle is at least partially transparent;
   wherein each clamping member rests within the animal enclosure in abutment with the lower surface and the stationary panel rests in abutment with the upper surface, thereby clamping the enclosure rim between the clamping member and stationary panel.

8. An animal enclosure cover comprising:
   a. a stationary panel including elongated stationary panel members, each stationary panel member including an upper surface and an opposing lower surface, wherein the stationary panel members at least partially define a peripheral frame on the stationary panel;
   b. at least one elongated clamping member, each clamping member including an upper surface and an opposing lower surface, and having its upper surface adjustably spaced in parallel relation to one or more lower surfaces of one or more stationary panel members,
   c. a fastener vertically descending from the stationary panel to the clamping member and allowing adjustable spacing therebetween, whereby the animal enclosure cover may be installed in an animal enclosure having an enclosure rim with opposing upper and lower enclosure rim surfaces, with the enclosure rim being clamped between the stationary panel and clamping members, with the lower surfaces of the stationary panel members abutting the upper enclosure rim surface and the upper surfaces of the clamping members being situated within the animal enclosure and abutting the lower enclosure rim surface.

9. The animal enclosure cover of claim 8 wherein the stationary panel includes a viewing portion defined therein, the viewing portion being at least partially surrounded by the stationary panel members, and wherein the viewing portion is at least partially transparent.

10. The animal enclosure cover of claim 8 including several clamping members arranged to define a clamping panel, wherein at least some of the clamping members within the clamping panel extend in parallel relation to at least a portion of the stationary panel when the enclosure rim is clamped between the stationary panel and the clamping panel.

11. The animal enclosure cover of claim 8 further comprising a door pivotally attached to the stationary panel.

12. The animal enclosure cover of claim 8 wherein:
the stationary panel includes four stationary panel members defining a rectangular peripheral frame having two pairs of opposing sides,
two clamping members are provided, each being adjustably spaced from one of the stationary panel members within one of the pairs of opposing sides.

13. In combination, an animal enclosure and animal enclosure cover comprising:
a. an animal enclosure including a receptacle which opens at an enclosure rim, wherein the enclosure rim has opposing upper and lower surfaces, and wherein the receptacle is at least partially transparent;
b. an animal enclosure cover including:
(1) a stationary panel extending about at least a portion of the enclosure rim atop the upper surface of the enclosure rim, and
(2) at least one clamping member situated within the receptacle and extending about at least a portion of the enclosure rim below the lower surface of the enclosure rim,
wherein each clamping member is adjustably affixed to the stationary panel, thereby allowing the clamping member and the stationary panel to be drawn together to clamp the enclosure rim therebetween.

14. The combination of claim 13 wherein the enclosure rim is rectangular and thereby has two pairs of opposing sides, and wherein clamping members extend below at least two opposing sides of the enclosure rim.

15. The combination of claim 13 wherein the enclosure rim is rectangular and thereby has two pairs of opposing sides, and wherein one or more clamping members each extend between two opposing sides of the enclosure rim.

16. The combination of claim 13 wherein the animal enclosure cover further includes a door pivotally affixed to the stationary panel, the door being pivotable between:
a. a closed position wherein the door extends about a portion of the enclosure rim, and
b. an open position angularly displaced from the closed position.

17. The combination of claim 16 wherein the door includes a lock which is actuatable to fix the door in the closed position.

18. The animal enclosure cover of claim 1:
wherein the upper surface of the clamping member extends horizontally outwardly from the attachment member and away from a region resting beneath the stationary panel,
whereby the animal enclosure cover may be fit on an enclosure rim of an animal enclosure, wherein the enclosure rim has opposing top and bottom rim surfaces, with the lower surface of the stationary panel resting within the animal enclosure in parallel spaced relationship to the upper surface of the clamping member, and having the enclosure rim clamped therebetween.

19. The animal enclosure cover of claim 18 wherein the attachment member extends vertically between the stationary panel and the clamping member.

20. The animal enclosure cover of claim 1 wherein the stationary panel includes a viewing portion at least partially encircled by the peripheral frame, and wherein the viewing portion is made of at least one of
a. mesh, and
b. translucent material.

* * * * *